(12) United States Patent
Honda (10) Patent No.: US 10,942,698 B2
(45) Date of Patent: Mar. 9, 2021

(54) CONTROL METHOD OF DISPLAY SYSTEM, DISPLAY SYSTEM, AND DISPLAY DEVICE

(71) Applicant: SEIKO EPSON CORPORATION, Tokyo (JP)

(72) Inventor: Masahiko Honda, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/522,761

(22) Filed: Jul. 26, 2019

(65) Prior Publication Data

US 2020/0034104 A1    Jan. 30, 2020

(30) Foreign Application Priority Data

Jul. 27, 2018   (JP) .............................. JP2018-140931

(51) Int. Cl.
| | |
|---|---|
| *G06F 15/177* | (2006.01) |
| *G06F 3/14* | (2006.01) |
| *H04N 9/31* | (2006.01) |
| *G06F 3/147* | (2006.01) |

(52) U.S. Cl.
CPC ............ *G06F 3/1446* (2013.01); *G06F 3/147* (2013.01); *G06F 3/1454* (2013.01); *H04N 9/3141* (2013.01); *G09G 2370/16* (2013.01)

(58) Field of Classification Search
CPC ...... G06F 3/1446; G06F 3/1454; G06F 3/147; H04N 9/3141; G09G 2370/16
USPC .......................................................... 709/222
See application file for complete search history.

(56) References Cited

U.S. PATENT DOCUMENTS

| | | | |
|---|---|---|---|
| 2014/0028817 A1* | 1/2014 | Brockway | H04N 5/23225 348/61 |
| 2016/0278135 A1* | 9/2016 | Monden | H04N 9/3147 |

FOREIGN PATENT DOCUMENTS

JP          2013-219471 A    10/2013

* cited by examiner

*Primary Examiner* — Wing F Chan
*Assistant Examiner* — Joseph R Maniwang
(74) *Attorney, Agent, or Firm* — Dority & Manning, PA (57) ABSTRACT

A control method of a display system including a plurality of display devices includes: transmitting, by each of the plurality of display devices, management information including identification information indicating that grouping is supported; acquiring, by a first display device as one of the plurality of display devices, the management information transmitted from a second display device; transmitting, by the first display device, connection information necessary for wireless connection to the first display device to the second display device; and wirelessly connecting, by the second display device, to the first display device based on the connection information, when the second display device receives the connection information from the first display device, to thereby participate in a group of the first display device.

14 Claims, 5 Drawing Sheets

CONTROL METHOD OF DISPLAY SYSTEM, DISPLAY SYSTEM, AND DISPLAY DEVICE

The present application is based on, and claims priority from JP Application Serial Number 2018-140931, filed Jul. 27, 2018, the disclosure of which is hereby incorporated by reference herein in its entirety.

BACKGROUND

1. Technical Field

The present disclosure relates to a control method of a display system, a display system, and a display device.

2. Related Art

A display system that displays an image using a plurality of display devices has been known. For example, JP-A-2013-219471 discloses an image transmission system in which a plurality of projectors are put into one group and an image is displayed using the plurality of projectors belonging to the group. This kind of system groups the plurality of projectors using a network function that each of the projectors has. The network function is the function of connecting a device to a network such as, for example, a wired local area network (LAN) or a wireless LAN. When the plurality of display devices are grouped using the wired LAN, it is difficult to lay a LAN cable depending on an installation environment of the display device. In contrast to this, when the plurality of display devices are grouped using the wireless LAN, it is unnecessary to lay a LAN cable, and therefore, restrictions on the installation environment of the display device are fewer than those when using the wired LAN.

JP-A-2013-219471 is an example of the related art.

However, when the plurality of display devices are grouped using the wireless LAN, network settings such as initial settings for wireless connection are more difficult than those when using the wired LAN. That is, when the plurality of display devices are grouped using the wireless LAN, properly performing the network settings for the plurality of display devices is troublesome work for a user, and usability such as user-friendliness is reduced.

SUMMARY

One aspect of a control method of a display system according to the present disclosure is directed to a control method of a display system including a plurality of display devices, the control method including: transmitting, by each of the plurality of display devices, management information including identification information indicating that grouping is supported; acquiring, by a first display device as one of the plurality of display devices, the management information transmitted from a second display device; transmitting, by the first display device, connection information necessary for wireless connection to the first display device to the second display device; and wirelessly connecting, by the second display device, to the first display device based on the connection information, when the second display device receives the connection information from the first display device, to thereby participate in a group of the first display device.

One aspect of a display system according to the present disclosure is directed to a display system including a plurality of display devices, wherein each of the plurality of display devices transmits management information including identification information indicating that grouping is supported, a first display device as one of the plurality of display devices acquires the management information transmitted from a second display device, the first display device transmits, to the second display device, connection information necessary for wireless connection to the first display device, and the second display device wirelessly connects to the first display device based on the connection information, when receiving the connection information from the first display device, to thereby participate in a group of the first display device.

One aspect of a display device according to the present disclosure is directed to a display device including: an acquiring section acquiring management information that is transmitted from another display device and that includes identification information indicating that grouping is supported; and a connection information transmitting section transmitting connection information necessary for wireless connection to its own display device to the other display device that transmits the management information for causing the display device to participate in a group of the own display device.

One aspect of a display device according to the present disclosure is directed to a display device including: a management information transmitting section transmitting management information including identification information indicating that grouping is supported; and a wireless connection control section wirelessly connecting, when receiving connection information necessary for wireless connection to a specific display device as one of other display devices from the specific display device, to the specific display device based on the connection information to thereby participate in a group of the specific display device.

DESCRIPTION OF EXEMPLARY EMBODIMENTS

Hereinafter, embodiments will be described with reference to the drawings. In the drawings, the dimensions and scale of each part are appropriately different from actual ones. Various technically preferred limitations are imposed on the embodiments. However, the scope of the present disclosure is not limited to these embodiments.

First Embodiment

Figure 1:
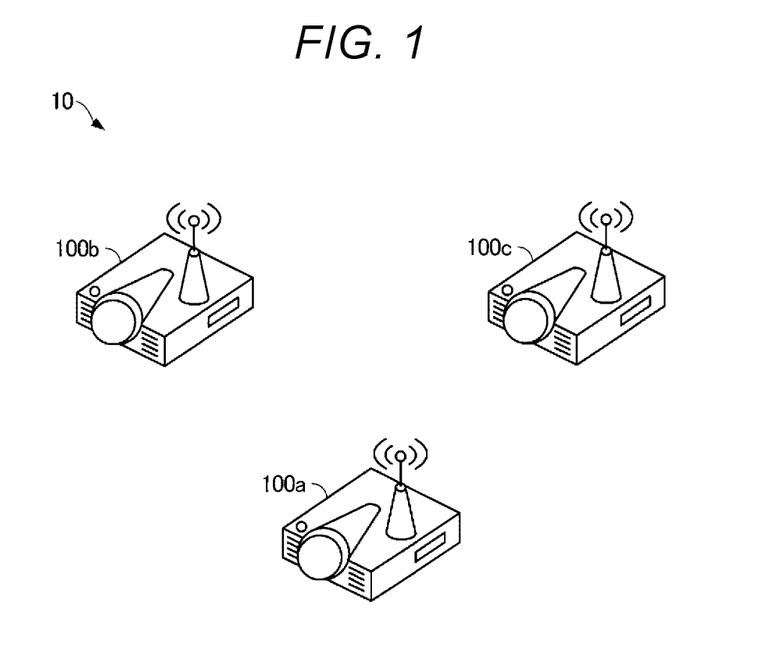
FIG. 1 is an explanatory view of a display system according to a first embodiment of the present disclosure.

A first embodiment of the present disclosure will be described with reference to FIGS. 1 to 4. FIG. 1 is an explanatory view of a display system 10 according to the first embodiment of the present disclosure. The display system 10 shown in FIG. 1 includes, for example, a plurality of display devices 100a, 100b, and 100c. The display devices 100a, 100b, and 100c are, for example, projectors.

The configurations of the display devices 100a, 100b, and 100c are the same as each other. For this reason, in the following, for example when there is no need to distinguish the display devices 100a, 100b, and 100c, the display devices 100a, 100b, and 100c are also referred to simply as "display devices 100". The number of the display devices 100 included in the display system 10 is not limited to three, and may be, for example, two or four or more.

The display system 10 can easily realize, for example, control for causing the plurality of display devices 100 belonging to the same group to work together to display an image by grouping the plurality of display devices 100. The way to use the grouping is not limited to causing the plurality of display devices 100 to work together to display an image.

For example, the display system 10 groups the plurality of display devices 100a, 100b, and 100c using a wireless function that each of the plurality of display devices 100a, 100b, and 100c has. The wireless function is set, according to the state of the display device 100, for example to any of an access point function by which the display device 100 functions as an access point and a client function by which the display device 100 functions as a client. For example, in an initial state, the wireless function is set to the access point function. The access point function is, for example, the SoftAP function, and causes the display device 100 to operate as an access point of a wireless LAN. The operation of the display system 10 in grouping the plurality of display devices 100 will be described with reference to FIG. 3. Before describing the operation of the display system 10, the configuration of the display device 100 will be described with reference to FIG. 2.

Figure 2:
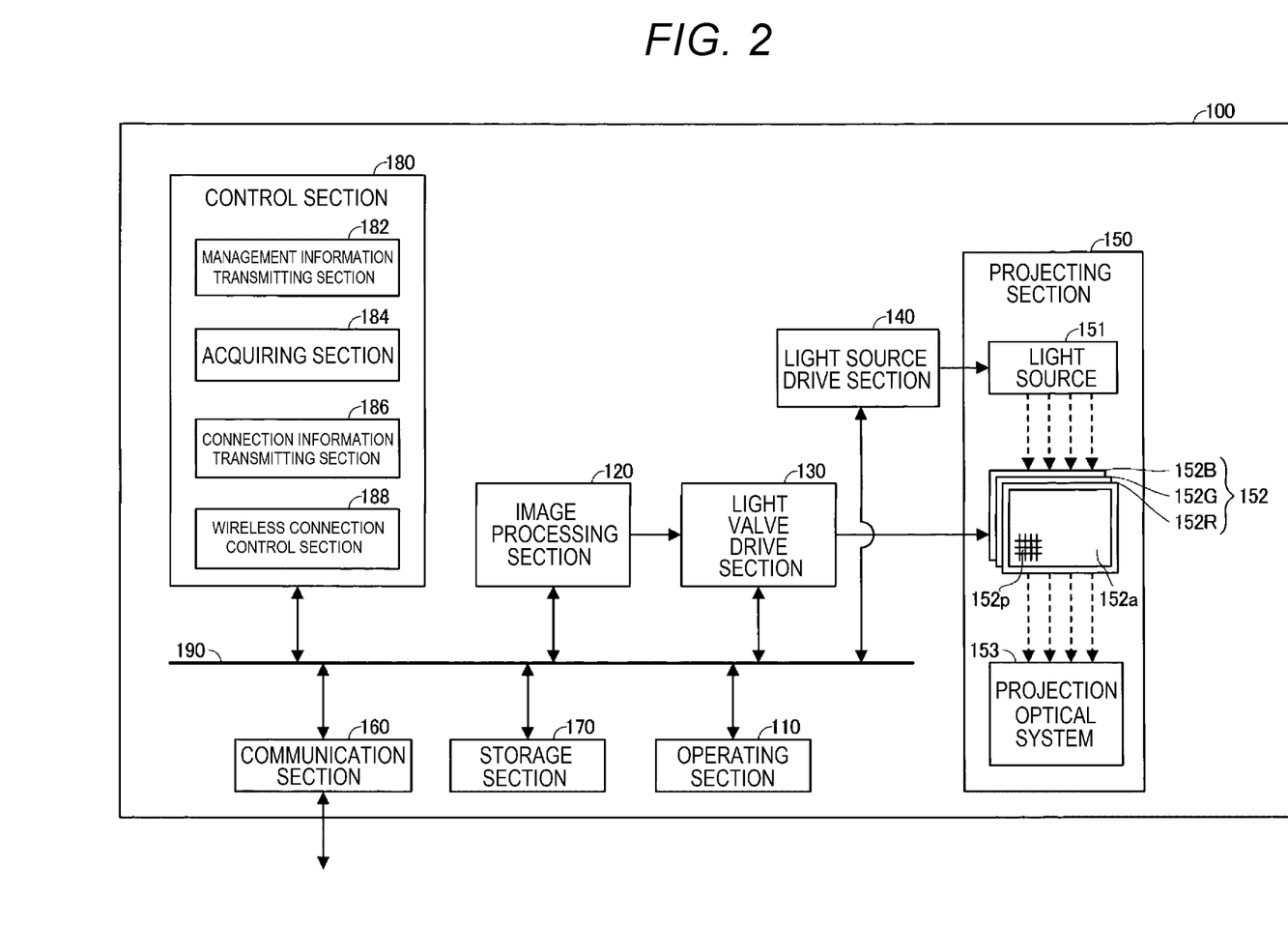
FIG. 2 is a block diagram showing the configuration of a display device according to the first embodiment.

FIG. 2 is a block diagram showing the configuration of the display device 100 according to the first embodiment. The display device 100 includes an operating section 110, an image processing section 120, a light valve drive section 130, a light source drive section 140, a projecting section 150, a communication section 160, a storage section 170, a control section 180, and a bus 190. The projecting section 150 includes a light source 151, three liquid crystal light valves 152R, 152G, and 152B, and a projection optical system 153. Hereinafter, the three liquid crystal light valves 152R, 152G, and 152B are also referred to collectively as "liquid crystal light valve 152".

The operating section 110, the image processing section 120, the light valve drive section 130, the light source drive section 140, the communication section 160, the storage section 170, and the control section 180 can mutually communicate via the bus 190.

The operating section 110 is, for example, various operating buttons or operating keys, or a touch panel. The operating section 110 accepts an input operation of a user, and outputs operating information in response to the input operation of the user. The operating section 110 may be a remote controller or the like that transmits the operating information wirelessly or by wire. When the remote controller is used as the operating section 110, the display device 100 includes a receiving section that receives the operating information transmitted by the remote controller. The remote controller includes various operating buttons or operating keys or a touch panel receiving the input operation performed by the user.

The image processing section 120 generates an image signal by executing image processing on image information. For example, the image processing section 120 generates the image signal by executing image processing on image information that is received from an image supply device (not shown) such as a personal computer.

The light valve drive section 130 drives the liquid crystal light valve 152 based on the image signal generated by the image processing section 120.

The light source drive section 140 drives the light source 151. For example, the light source drive section 140 causes the light source 151 to emit light when the operating section 110 accepts a power-on operation.

The projecting section 150 projects a projection image onto a projection surface such as a screen. The projection surface is not limited to a screen but can be appropriately changed. For example, the projection surface may be a wall. The light source 151 is, for example, a light emitting diode (LED). The light source 151 is not limited to the LED. For example, the light source 151 may be a xenon lamp, an extra-high-pressure mercury lamp, or a laser light source. Variations in the brightness distribution of the light emitted from the light source 151 are reduced by an integrator optical system (not shown), and thereafter, the light is separated by a color separating optical system (not shown) into color light components of red, green, and blue, which are the three primary colors of light. The color light components of red, green, and blue are respectively incident on the liquid crystal light valves 152R, 152G, and 152B.

The liquid crystal light valve 152 is composed of, for example, a liquid crystal panel in which liquid crystal is encapsulated between a pair of transparent substrates. The liquid crystal light valve 152 includes a rectangular pixel region 152a, and the pixel region 152a includes a plurality of pixels 152p arranged in a matrix. In the liquid crystal light valve 152, a drive voltage can be applied to the liquid crystal for each of the pixels 152p. When the light valve drive section 130 applies, to each of the pixels 152p, the drive voltage based on the image signal received from the image processing section 120, each of the pixels 152p is set to a light transmittance based on the image signal. For this reason, the light emitted from the light source 151 is modulated by transmitting through the pixel region 152a, and an image based on the image signal is formed for each color light.

The images of the respective colors are combined by a color combining optical system (not shown) for each of the pixels 152p, and a projection image as a color image is generated. The projection image is enlarged and projected onto the projection surface by the projection optical system 153.

The communication section 160 is, for example, a wireless communication interface such as a wireless LAN. The communication section 160 may have the function of an interface such as a wired LAN. For example, the communication section 160 communicates with another display device 100 via a network. The storage section 170 is a computer-readable recording medium. For example, the storage section 170 stores a program to define the operation of the display device 100, and various kinds of information.

The control section 180 is a computer such as a central processing unit (CPU), and controls the overall operation of the display device 100. The control section 180 may include one or a plurality of processors.

The control section 180 realizes, according to processes, the functions of a management information transmitting section 182, an acquiring section 184, a connection information transmitting section 186, and a wireless connection control section 188 by reading and executing the program stored in the storage section 170. For example, the control section 180 of the display device 100 that functions as a master unit includes the management information transmitting section 182, the acquiring section 184, and the connection information transmitting section 186. The control section 180 of the display device 100 that functions as a client includes the management information transmitting section 182 and the wireless connection control section 188. Next, with reference to FIG. 3, the operation of the display system 10 will be described focusing on the operation of the management information transmitting section 182, the acquiring section 184, the connection information transmitting section 186, and the wireless connection control section 188.

Figure 3:
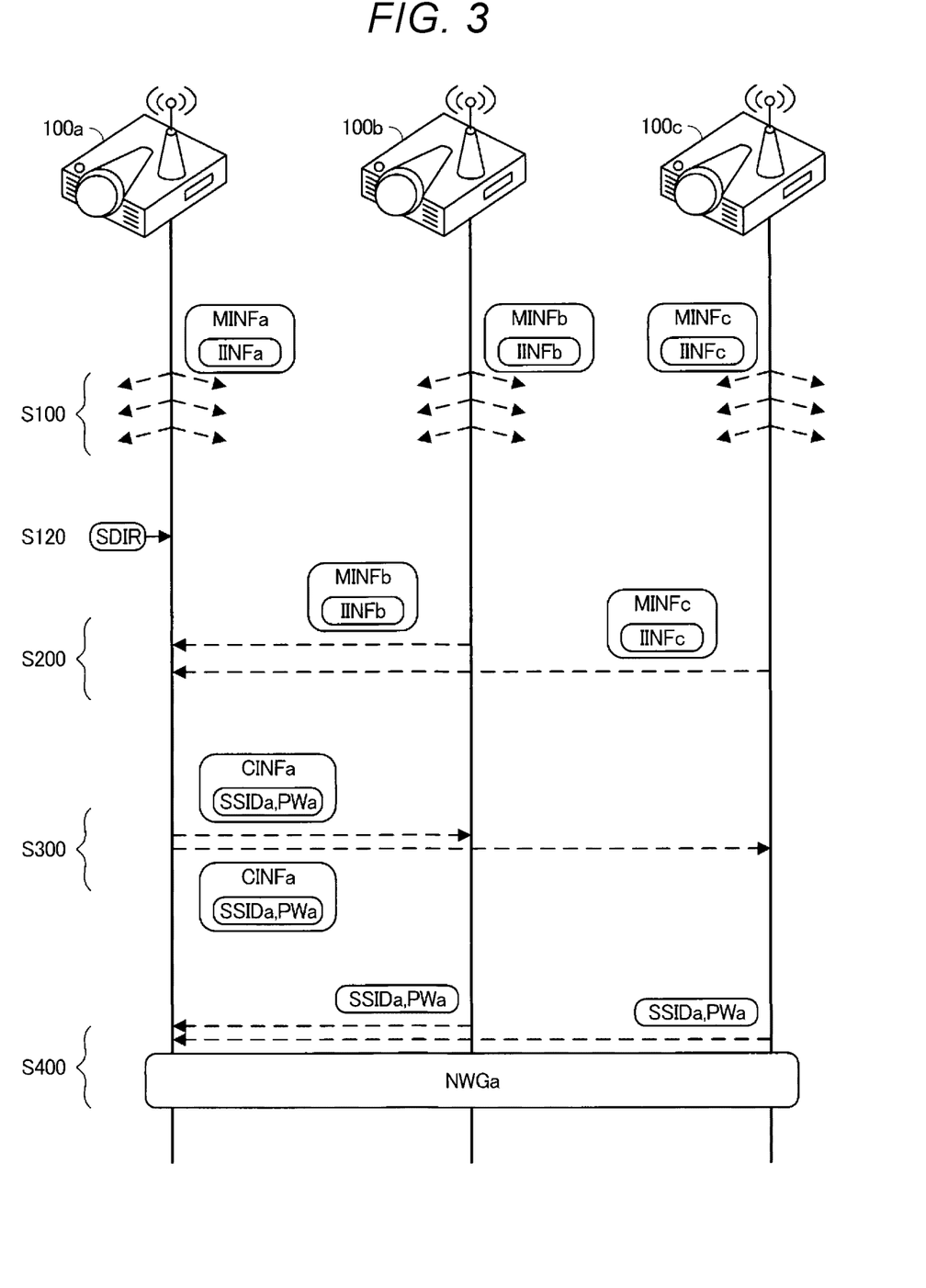
FIG. 3 is an explanatory view for explaining the operation of the display system according to the first embodiment.

FIG. 3 is an explanatory view for explaining the operation of the display system 10 according to the first embodiment. The operation shown in FIG. 3 is one example of a control method of the display system 10 including the plurality of display devices 100. The operation shown in FIG. 3 shows the operation of the display system 10 until the plurality of display devices 100a, 100b, and 100c are grouped. In the example shown in FIG. 3, the display device 100a is an example of a first display device and a specific display device, and the display devices 100b and 100c are examples of a second display device.

In FIG. 3, for distinguishing transmission sources of information such as identification information IINF, management information MINF, connection information CINF, a service set identifier SSID, and a password PW, "a", "b", or "c" is suffixed to the reference signs. In the following, the information such as the identification information IINF, the management information MINF, the connection information CINF, the service set identifier SSID, and the password PW may be referred to without "a", "b", or "c" suffixed to the reference signs.

In the initial state before a process in Step S100 is executed, the wireless function of each of the display devices 100a, 100b, and 100c is set to the access point function.

In Step S100, the control section 180 of each of the display devices 100a, 100b, and 100c functions as the management information transmitting section 182, and transmits the management information MINF including the identification information IINF indicating that grouping is supported. The phrase "grouping is supported" or "supports grouping" as used herein means that the display device can configure one group together with another display device 100. For example, by configuring a group of the display devices 100, processes such as instructions and settings on the display devices 100 in the same group can be collectively executed via the display device 100 that operates as a master unit of the group. The management information MINF is, for example, beacon information, and is repeatedly transmitted using a management frame of a wireless LAN. Vendor-specific information can be given to the management frame. For example, the identification information IINF indicating that grouping is supported is given to the management information MINF.

For example, the display device 100a repeatedly transmits management information MINFa including identification information IINFa. The display device 100b repeatedly transmits management information MINFb including identification information IINFb. The display device 100c repeatedly transmits management information MINFc including identification information IINFc. The identification information IINF may also be used as the service set identifier SSID. The service set identifier SSID is a character string for identifying an access point of a wireless LAN. For example, a portion of the character string represented by the service set identifier SSID may be assigned to a character string indicating that grouping is supported. The process in Step S100 is repeatedly executed while the wireless function is set to the access point function.

Next, in Step S120, the control section 180 of the display device 100a accepts a start instruction SDIR for instructing the start of a grouping process for forming a group. For example, the user executes an operation to select the display device 100a as a master unit among the display devices 100a, 100b, and 100c on the operating section 110 of the display device 100a. Then, the control section 180 of the display device 100a accepts operating information indicating that the display device 100a is selected as a master unit as the start instruction SDIR of the grouping process in which the display device 100a serves as a master unit. As a result of this, the display device 100a functions as a master unit of the group, that is, as an access point of a network used by the group, and executes processes in Steps S200 and S300. The processes in Steps S200 and S300 are executed after the start instruction SDIR is accepted, and therefore, the execution of the grouping process at the unintended timing of the user can be inhibited.

In Step S200, the control section 180 of the display device 100a functions as the acquiring section 184, and acquires the management information MINFb and MINFc transmitted from the other display devices 100b and 100c. The management information MINF acquired by the display device 100a may be the management information MINF transmitted from the other display devices 100 before the acceptance of the start instruction SDIR. In this case, the display device 100a holds the latest management information MINFb and MINFc respectively transmitted from the display devices 100b and 100c until the display device 100a executes the process in Step S200.

Next, in Step S300, the control section 180 of the display device 100a functions as the connection information transmitting section 186, and transmits connection information CINFa necessary for wireless connection to the display device 100a to the display devices 100b and 100c as the transmission sources of the management information MINF including the identification information IINF. The connection information CINFa is, for example, a beacon request, and is transmitted using the management frame of the wireless LAN. As described above, vendor-specific information can be given to the management frame. For example, information such as the service set identifier SSIDa, the password PWa, and the kind of security of the display device 100a, and a start notification to notify the display devices 100b and 100c of the start of the grouping process in which the display device 100a serves as a master unit is given to the connection information CINFa. The service set identifier SSID and the password PW of the display device 100 that functions as a master unit are examples of the contents of the connection information CINF necessary for wireless connection.

When receiving the connection information CINFa including the start notification to notify the display devices 100b and 100c of the start of the grouping process, the display devices 100b and 100c execute a process in Step S400.

In Step S400, the control section 180 of each of the display devices 100b and 100c functions as the wireless connection control section 188, and wirelessly connects to the display device 100a based on the connection information CINFa to thereby participate in a group NWGa of the display device 100*a*. The group NWGa is, for example, a wireless LAN group in which the display device 100*a* serves as an access point.

For example, when receiving the connection information CINFa including the start notification to notify the display devices 100*b* and 100*c* of the start of the grouping process from the display device 100*a*, the display devices 100*b* and 100*c* switch the wireless function from the access point function to the client function. Then, the display devices 100*b* and 100*c* wirelessly connect to the display device 100*a* that operates as an access point using, for example, the service set identifier SSIDa and the password PWa included in the connection information CINFa. As a result of this, the display devices 100*b* and 100*c* are included in the group NWGa of the wireless LAN in which the display device 100*a* serves as an access point. For example, the display device 100*a* operates like a master as a master unit in the group NWGa, and the display devices 100*b* and 100*c* operate like slaves as slave units in the group NWGa.

Other than the display device 100 that supports grouping, it is unknown at which position in the management frame the information such as the password PW and the kind of security is stored, and therefore, it is difficult for a third party to abuse the connection information CINF. Hence, a reduction in security can be inhibited. The display device 100 may store the password PW not in plain text but in encrypted form. As the method for encryption and decryption, a unique algorithm is set for the connection information transmitting section 186 and the wireless connection control section 188 of each of the display devices 100 of the display system 10, so that only the display device 100 is readable.

As shown in FIG. 3, when the user performs an operation to select one of the plurality of display devices 100 as a master unit, the plurality of display devices 100 can be grouped using the wireless LAN without performing network settings such as initial settings for wireless connection on each of the display devices 100. That is, the plurality of display devices 100 can be easily grouped using the wireless LAN. Hence, in the display system 10, when the plurality of display devices 100 are grouped using the wireless LAN, the work of the user can be reduced, and usability such as user-friendliness can be improved.

For example, when the display system 10 is used for projection mapping, when the user performs an operation to select, as a master unit, one of the plurality of display devices 100 that are used for projection mapping, the plurality of display devices 100 can be easily grouped. For this reason, even when the plurality of display devices 100 are grouped for each event of projection mapping, an increase in the work load of the user can be suppressed.

Moreover, in the display system 10, the connection information CINFa is transmitted using the management frame of the wireless LAN. A method in which the connection information CINFa is included in the service set identifier SSID is also considered. However, the service set identifier SSID has a limit of 32 characters, and therefore, it is difficult to include the connection information CINFa in the service set identifier SSID. Further, the user can easily see the service set identifier SSID, and therefore, when the password PW is included in the service set identifier SSID, there is a risk that security is reduced.

In contrast to this, in order to see the contents of the management frame of the wireless LAN, a capture facility for a wireless frame is needed. Therefore, in the display system 10, an opportunity for the user and a third party to see the password PW stored in the management frame of the wireless LAN can be reduced. As a result of this, security can be improved compared to that when the password PW is included in information such as the service set identifier SSID that the user can see. Moreover, in the display system 10, the transmitting and receiving of the management information MINF and the connection information CINF is realized within the range of general wireless LAN standards, and therefore, the operation shown in FIG. 3 can be realized in a general hardware environment. Next, with reference to FIG. 4, the operation of the display device 100 will be described.

Figure 4:
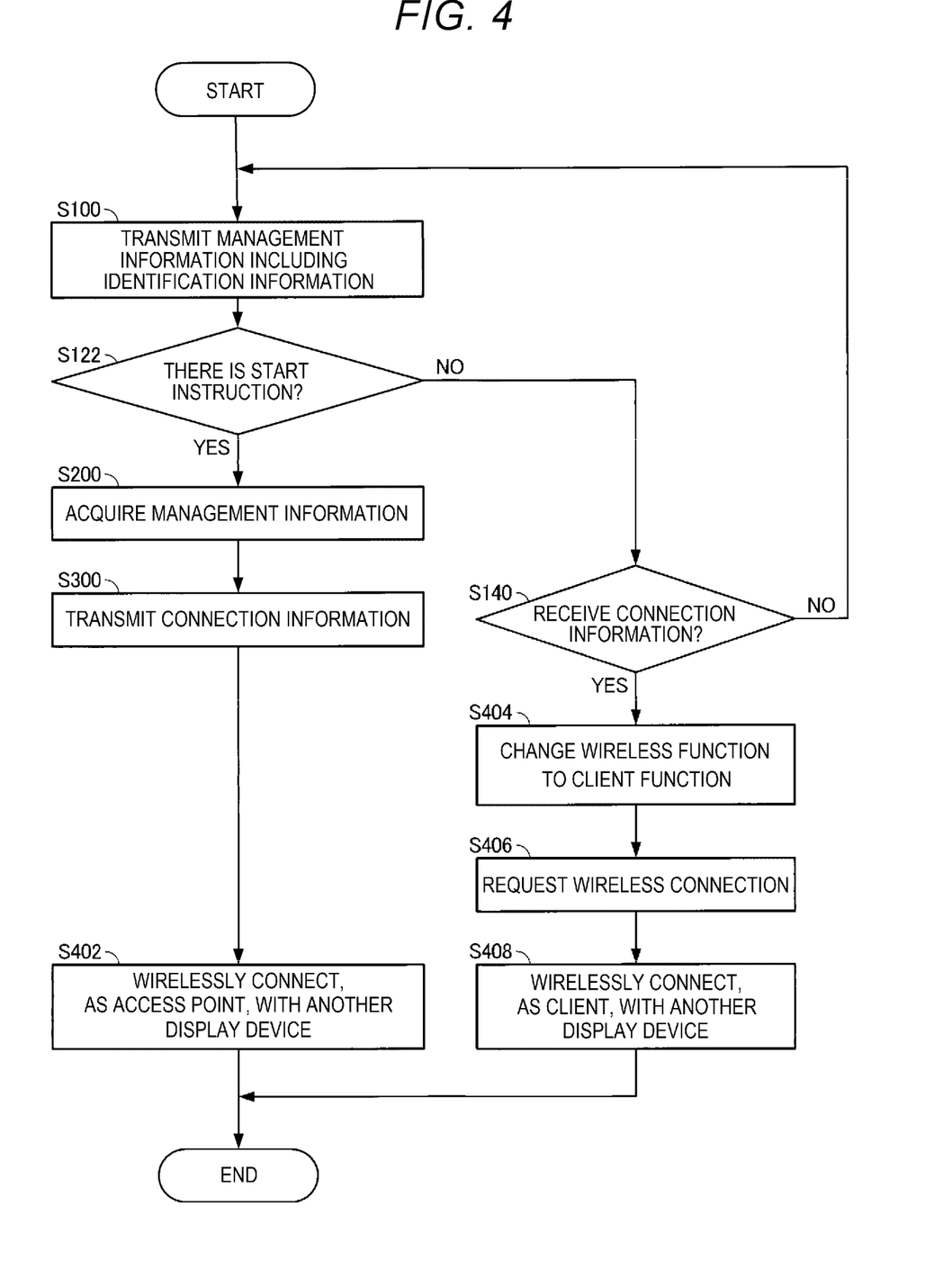
FIG. 4 is a flowchart showing one example of the operation of the display device according to the first embodiment.

FIG. 4 is a flowchart showing an example of the operation of the display device 100 according to the first embodiment. The operation shown in FIG. 4 is an example of a control method of the display device 100 included in the display system 10. That is, the operation shown in FIG. 4 is an example of the control method of the display system 10. The initial state of the wireless function of the display device 100 is set to the access point function. Processes in Steps S100, S200, and S300 are similar to the processes in Steps S100, S200, and S300 of FIG. 3, and therefore, a detailed description is omitted. A process in Step S122 corresponds to the process in Step S120 of FIG. 3. Moreover, a process in Step S402 and a series of processes in Steps S404, S406, and S408 correspond to the process in Step S400 of FIG. 3.

In Step S100, the control section 180 of the display device 100 functions as the management information transmitting section 182, and transmits the management information MINF including the identification information IINF indicating that grouping is supported. The process in Step S100 is repeatedly executed while the wireless function is set to the access point function.

Next, in Step S122, the control section 180 of the display device 100 determines whether or not there is the start instruction SDIR. For example, the control section 180 determines that there is the start instruction SDIR when the operating section 110 accepts an operation to select the display device 100 as a master unit. That is, the control section 180 determines that there is no start instruction SDIR when the operating section 110 does not accept the operation to select the display device 100 as a master unit. When there is the start instruction SDIR, the display device 100 shifts the operation to Step S200, and operates as an access point of a network used by a group. On the other hand, when there is no start instruction SDIR, the operation of the display device 100 shifts to Step S140.

In Step S140, the control section 180 of the display device 100 determines whether or not the display device 100 receives the connection information CINF from another display device 100. When receiving the connection information CINF from another display device 100, the display device 100 shifts the operation to Step S404, and operates as a client. On the other hand, when not receiving the connection information CINF from another display device 100, the display device 100 returns the operation to Step S100. That is, the display device 100 repeats a series of processes in Steps S100, S122, and S140 until it is determined whether the display device 100 operates as an access point or a client.

When operating as an access point, the display device 100 executes a series of processes in Steps S200, S300, and S402.

In Step S200, the control section 180 of the display device 100 functions as the acquiring section 184, maintains the wireless function as the access point function, and acquires the management information MINF transmitted from another display device 100.

Next, in Step S300, the control section 180 of the display device 100 functions as the connection information transmitting section 186, and transmits the connection information CINF necessary for wireless connection to its own display device 100 to the display device 100 as the transmission source of the management information MINF including the identification information IINF for causing the display device 100 to participate in a group of the own display device 100.

Next, in Step S402, the display device 100 wirelessly connects, as an access point, with another display device 100. For example, the control section 180 of the display device 100 wirelessly connects with another display device 100 in response to a request for wireless connection from the another display device 100 using the password PWa included in the connection information CINF. The display device 100 that operates as an access point causes the another display device 100 to wirelessly connect to the display device 100 itself to thereby cause the another display device 100 to participate in the group of the display device 100 itself.

On the other hand, when operating as a client, the display device 100 executes the series of processes in Steps S404, S406, and S408.

In Step S404, the control section 180 of the display device 100 functions as the wireless connection control section 188, and changes the wireless function from the access point function to the client function. The wireless connection control section 188 switches the wireless function from the access point function to the client function, and thereby, the display device 100 can be caused to operate as a client.

Next, in Step S406, the control section 180 of the display device 100 functions as the wireless connection control section 188, and requests wireless connection to the display device 100 as the transmission source of the connection information CINF. For example, the display device 100 that operates as a client requests wireless connection to the display device 100 that operates as an access point, that is, to the display device 100 as the transmission source of the connection information CINF using the service set identifier SSID and the password PW included in the connection information CINF.

Next, in Step S408, the display device 100 wirelessly connects, as a client, with another display device 100. For example, the control section 180 of the display device 100 functions as the wireless connection control section 188, and wirelessly connects to the display device 100 that operates as an access point when the request for wireless connection to the access point is accepted. The display device 100 that operates as a client wirelessly connects to the display device 100 that operates as an access point, and thereby participates in the group of the display device 100 that operates as an access point.

The operation of the display device 100 is not limited to the example shown in FIG. 4. For example, the process in Step S140 may be executed before the process in Step S122. In this case, the process in Step S122 is executed when the display device 100 does not receive the connection information CINF from another display device 100. Moreover, when the process in Step S140 is executed before the process in Step S122, when it is determined in the process in Step S122 that there is no start instruction SDIR, the operation of the display device 100 returns to Step S100.

As described above, in the first embodiment, each of the plurality of display devices 100 included in the display system 10 transmits the management information MINF including the identification information IINF indicating that grouping is supported. Then, the first display device 100 as one of the plurality of display devices 100 acquires the management information MINF transmitted from another display device 100. Moreover, the first display device 100 transmits, to the second display device 100 as the display device 100 as the transmission source of the management information MINF including the identification information IINF, the connection information CINF necessary for wireless connection to the first display device 100. Then, when receiving the connection information CINF from the first display device 100, the second display device 100 wirelessly connects to the first display device 100 based on the connection information CINF, and thereby participates in the group of the first display device 100.

Hence, the user of the display system 10 can easily group the plurality of display devices 100 using a wireless network without performing network settings such as initial settings for wireless connection on each of the display devices 100. That is, in the display system 10, when the plurality of display devices 100 are grouped using the wireless network, the work of the user can be reduced, and usability such as user-friendliness can be improved.

Second Embodiment

A main difference between a second embodiment and the first embodiment is that a control device 200 is wirelessly connected to the display device 100 that operates as an access point among the plurality of display devices 100.

Figure 5:
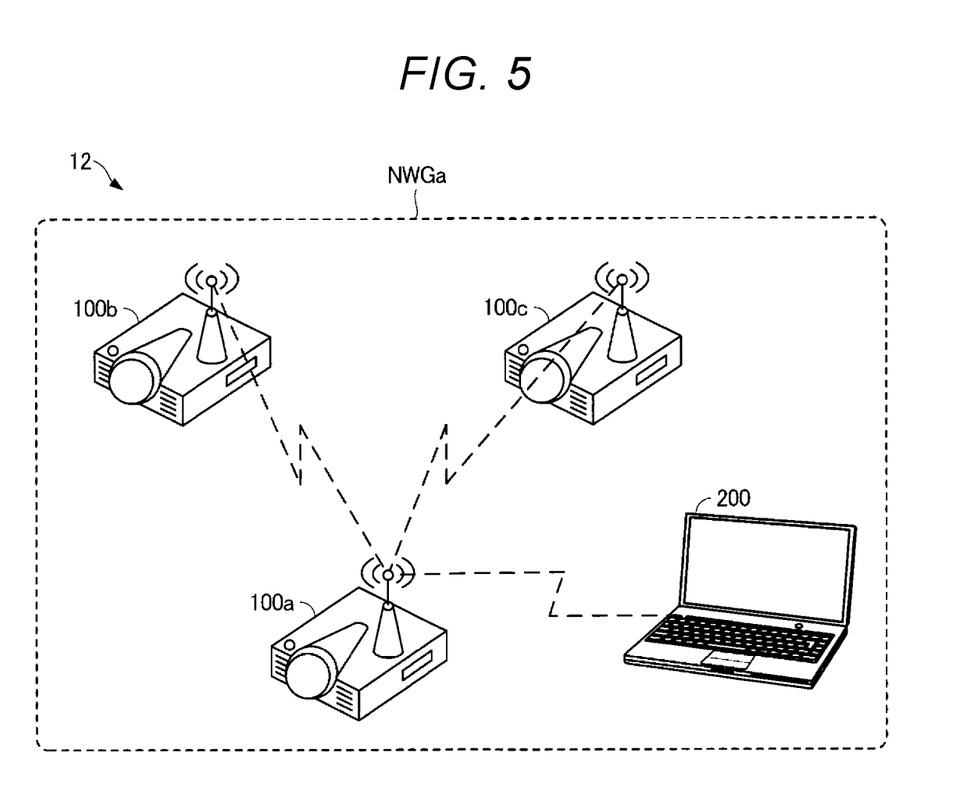
FIG. 5 is an explanatory view of a display system according to a second embodiment.

FIG. 5 is an explanatory view of a display system 12 according to the second embodiment. The same elements as the elements already described with reference to FIGS. 1 to 4 are denoted by the same reference numerals and signs, and a detailed description is omitted. The display system 12 shown in FIG. 5 is the same as the display system 10 in FIG. 1, excepting that the control device 200 is added to the display system 10 in FIG. 1. For example, the display system 12 includes the plurality of display devices 100a, 100b, and 100c and the control device 200. The number of the display devices 100 included in the display system 12 is not limited to three, and may be, for example, two or four or more. The display devices 100a, 100b, and 100c have been already described with reference to FIGS. 1 to 4, and therefore, the control device 200 will be mainly described. In the example shown in FIG. 5, the display device 100a operates as an access point among the display devices 100a, 100b, and 100c.

The control device 200 is, for example, a personal computer, is wirelessly connected to the group NWGa of the display device 100a that operates as an access point, and controls the display devices 100a, 100b, and 100c belonging to the group NWGa of the display device 100a. The control device 200 is not limited to a personal computer. For example, the control device 200 may be an information terminal such as a smartphone or a tablet terminal.

For example, after the process in Step S400 of FIG. 3, the control device 200 wirelessly connects to the display device 100a using the service set identifier SSIDa and the password PWa of the display device 100a. The method of wirelessly connecting the control device 200 to the display device 100a may be a known method or the same method as that when the display devices 100b and 100c wirelessly connect to the display device 100a. For example, the control device 200 may request the display device 100a to transmit the connection information CINFa, and wirelessly connect to the display device 100a using the service set identifier SSID and the password PW included in the connection information CINFa transmitted from the display device 100a.

Moreover, the timing at which the control device 200 is wirelessly connected to the display device 100a is not limited to that after the process in Step S400 of FIG. 3. For example, before the process in Step S120 of FIG. 3, the control device 200 may wirelessly connect to the display device 100a. In the following, the operation of the control device 200 when the control device 200 is wirelessly connected to the display device 100a before the process in Step S120 of FIG. 3 will be described.

The control device 200 displays a list of the display devices 100 that support grouping on a display of the control device 200 based on the management information MINFa, MINFb, and MINFc respectively transmitted from the display devices 100a, 100b, and 100c in the process in Step S100 of FIG. 3. Then, the user executes an operation to select a master unit from the list of the display devices 100 that support grouping on the control device 200. For example when the display device 100 that is not allowed to participate in the group is included in the list of the display devices 100 that support grouping, the display device 100 that is caused to operate as a client may also be selected when a master unit is selected from the list of the display devices 100 that support grouping. Alternatively, the display device 100 that is not allowed to participate in the group may be specified from the list of the display devices 100 that support grouping.

When accepting an operation to select, for example, the display device 100a as a master unit, the control device 200 requests the display device 100a to transmit the connection information CINFa. The display device 100a accepts the request for transmission of the connection information CINFa as the start instruction SDIR, executes the processes in Steps S200 and S300 of FIG. 3, and further transmits the connection information CINFa to the control device 200. When the display device 100a is notified of a list of the display devices 100 that operate as clients from the control device 200, the process in Step S200 of FIG. 3 may be omitted. The control device 200 wirelessly connects to the display device 100a using the service set identifier SSID and the password PW included in the connection information CINFa transmitted from the display device 100a.

As described above, also in the second embodiment, advantageous effects similar to those of the first embodiment can be obtained. Moreover, in the second embodiment, the control device 200 controlling the display devices 100 belonging to the group of the first display device 100 is wirelessly connected to the first display device 100. As a result of this, control for the plurality of display devices 100 belonging to the same group can be easily executed using the control device 200 such as a personal computer, and usability such as user-friendliness can be improved.

MODIFIED EXAMPLES

Each of the first embodiment and the second embodiment may be variously modified. Specific modification forms will be exemplified below. Two or more forms arbitrarily selected from the following examples may be appropriately combined within a range not conflicting with each other.

Modified Example 1

In each of the first embodiment and the second embodiment, each of the display devices 100 may display, in response to the operation of the user, the list of the display devices 100 that support grouping on a setting screen such as an on-screen display (OSD) menu. The list of the display devices 100 that support grouping is generated based on, for example, the management information MINF including the identification information IINF transmitted from each of the display devices 100. In this case, the process in Step S200 of FIG. 3 may be omitted. Moreover, when a master unit is selected from the list of the display devices 100 that support grouping, the display device 100 that is caused to operate as a client may also be selected. Alternatively, the display device 100 that is not allowed to participate in the group may be specified from the list of the display devices 100 that support grouping.

Also in Modified Example 1, advantageous effects similar to those of each of the first embodiment and the second embodiment can be obtained. Moreover, in Modified Example 1, the list of the display devices 100 that support grouping is displayed, and therefore, the user can easily recognize the display device 100 to be grouped.

Modified Example 2

In each of the first embodiment and the second embodiment, the display device 100 that functions as a master unit among the plurality of display devices 100 may be previously determined. For example, when the display device 100a is previously determined as the display device 100 that functions as a master unit, the user executes an operation to instruct the start of the grouping process, instead of the operation to select the display device 100a as a master unit, on the operating section 110 of the display device 100a in Step S120 of FIG. 3. Alternatively, the process in Step S120 may be omitted, and the display device 100a may repeatedly execute the series of processes in Steps S100, S200, and S300.

Modified Example 3

In each of the first embodiment and the second embodiment, a display device 100 used exclusively as a slave unit, which can operate not as a master unit but exclusively as a slave unit after grouping, may be present in the plurality of display devices 100. For example, when the user considers that only a specific display device 100 is caused to operate as a master unit, the display device 100 that is not considered to operate as a master unit is caused to operate exclusively as a slave unit, and thereby, grouping not intended by the user can be prevented.

Modified Example 4

In each of the first embodiment and the second embodiment, the display device 100 that functions as a master unit may transmit a time stamp indicating the time by including the time stamp in the connection information CINF. In this case, the display systems 10 and 12 may set the time of the display device 100 that functions as a client to the time of the display device 100 that functions as a master unit using the transmission of the connection information CINF and a response to the connection information CINF. That is, the display systems 10 and 12 may realize time synchronization among the plurality of display devices 100 that support grouping using the management frame of the wireless LAN.

Modified Example 5

In each of the first embodiment and the second embodiment, the display device 100 that functions as a master unit may transmit text information by including the text information in the connection information CINF. In addition, the display device 100 that receives the connection information CINF may display a message represented by the text information included in the connection information CINF on a screen such as a projection surface or an OSD menu. That is, the display systems 10 and 12 may transmit a message by broadcast to the plurality of display devices 100 that support grouping using the management frame of the wireless LAN.

Modified Example 6

All or a portion of elements realized by the control section 180 by reading and executing the program may be realized by, for example, hardware using an electronic circuit such as a field programmable gate array (FPGA) or an application specific IC (ASIC), or realized by software and hardware working together.

Modified Example 7

The display device 100 is not limited to a projector. For example, the display device 100 may be a direct-view-type liquid crystal display or plasma display.

What is claimed is:

1. A control method of a display system including a plurality of display devices, the control method comprising:
    transmitting, by each of the plurality of display devices via an access point function by which each of the display devices functions as an access point, management information including identification information indicating that grouping is supported;
    acquiring, by a first display device as one of the plurality of display devices, the management information transmitted from a second display device from the plurality of display devices;
    transmitting, by the first display device, connection information necessary for wireless connection to the first display device to the second display device; and
    wirelessly connecting, by the second display device, to the first display device based on the connection information, when the second display device receives the connection information from the first display device, to thereby participate in a group of the first display device,
    wherein each of the plurality of display devices transmits respective management information via the access point function until receiving a start instruction or receiving respective connection information from another one of the display devices.

2. The control method of the display system according to claim 1, wherein
    the first display device transmits the connection information to the second display device when accepting a start instruction to instruct start of a grouping process for forming a group.

3. The control method of the display system according to claim 1, further comprising
    wirelessly connecting, to the first display device, a control device controlling the first display device and the second display device belonging to the group of the first display device.

4. The control method of the display system according to claim 1, wherein
    of the access point function by which the display devices respectively, function as an access point and a client function by which each of one or more of the display devices respectively functions as a client, an initial state of a wireless function for each of the plurality of display devices is the access point function, and
    the second display device switches the wireless function from the access point function to the client function when receiving the connection information from the first display device, and wirelessly connects to the first display device based on the connection information.

5. The control method of the display system according to claim 1, further comprising:
    determining, by the first display device, whether connection information has been received from another one of the display devices.

6. The control method of the display system according to claim 1, further comprising:
    determining, by the first display device, whether a start instruction to instruct start of a grouping process for forming a group has been received.

7. The control method of the display system according to claim 1, wherein the first display device determines whether a start instruction to instruct start of a grouping process for forming a group has been received before determining whether respective connection information has been received from another one of the display devices.

8. The control method of the display system according to claim 1, wherein the connection information is transmitted using a management frame of a wireless network.

9. The control method of the display system according to claim 1, wherein the second display device switches from the access point function to a client function based, at least in part on receiving the connection information from the first display device.

10. The control method of the display system according to claim 9, wherein the second display device requests wireless connection to the display device after switching to the client function.

11. The control method of the display system according to claim 1, wherein the second display device wirelessly connects to the first display device without performing network settings for wireless connection on the display devices.

12. A display system comprising a plurality of display devices, wherein
    each of the plurality of display devices is configured to transmit, respectively as an access point via an access point function, management information including identification information indicating that grouping is supported,
    a first display device as one of the plurality of display devices the first display device being configured to acquire the management information transmitted from a second display device from the plurality of display devices,
    the first display device being configured to transmit to the second display device, connection information necessary for wireless connection to the first display device, and
    the second display device being configured to wirelessly connect to the first display device based on the connection information, when receiving the connection information from the first display device, to thereby participate in a group of the first display device,
    wherein the first display device and the second display device each are configured to function as an access point and transmit respective management information via an access point function until receiving a start instruction or receiving connection information from another display device.

13. A display device comprising:
one or more non-transitory computer-readable media configured to store instructions; and
one or more processors operatively coupled to the one or more non-transitory computer-readable media, wherein the one or more processors execute the instructions that cause the display device to;
acquire management information that is transmitted from a second display device, the management information including identification information indicating that grouping is supported; and
transmit connection information necessary for wireless connection to the display device to the second display device to cause the second display device to participate in a group of the display device,
wherein the display device and the second display device each are configured to function as an access point and transmit respective management information via an access point function until receiving a start instruction or receiving connection information from another display device.

14. A display device comprising:
one or more non-transitory computer-readable media configured to store instructions; and
one or more processors operatively coupled to the one or more non-transitory computer-readable media, wherein the one or more processors execute the instructions that cause the display device to:
transmit management information including identification information indicating that grouping is supported; and
wirelessly connect when receiving connection information for wireless connection to a second display device based on the connection information to participate in a group of the second display device,
wherein the display device and the second display device each are configured to function as an access point and transmit respective management information via an access point function until receiving a start instruction or receiving connection information from another display device.

* * * * *